(No Model.)
G. P. EVELYN.
SPIRIT LEVEL.
No. 363,998. Patented May 31, 1887.
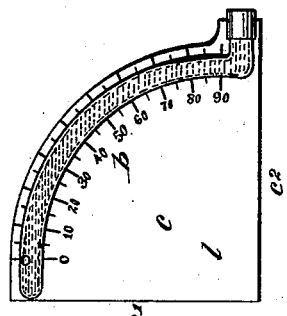
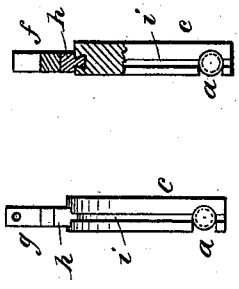
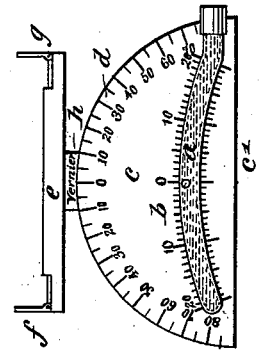
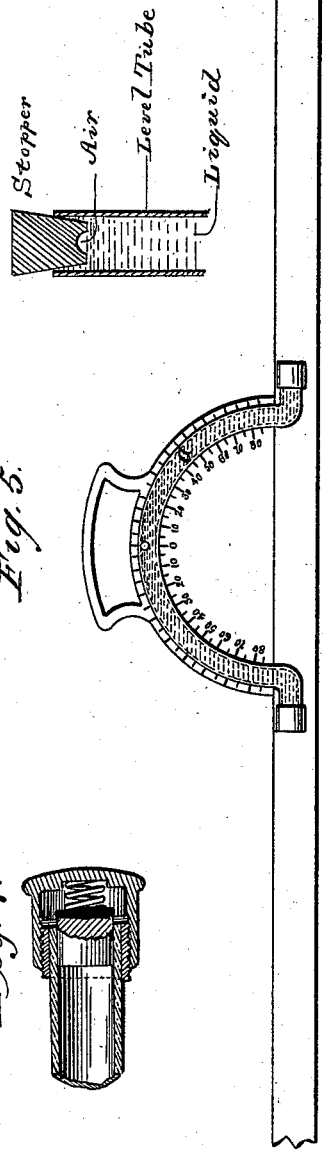
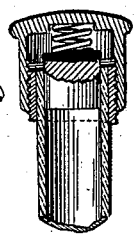
WITNESSES:
Donn Twitchell.
C. Sedgwick
INVENTOR:
G. P. Evelyn
BY Munn & Co.
ATTORNEYS.

UNITED STATES PATENT OFFICE.

GEORGE PALMER EVELYN, OF PALL MALL, COUNTY OF MIDDLESEX, ENGLAND.

SPIRIT-LEVEL.

SPECIFICATION forming part of Letters Patent No. 363,998, dated May 31, 1887.

Application filed March 1, 1886. Serial No. 193,700. (No model.) Patented in England February 12, 1885, No. 1,964; in France May 2, 1885, No. 168,956; in Belgium May 4, 1885, No. 68,751, and in Germany May 12, 1885, No. 34,574.

*To all whom it may concern:*

Be it known that I, GEORGE PALMER EVELYN, of the Army and Navy Club, Pall Mall, in the county of Middlesex, England, honorary colonel Third Battalion East Surrey regiment, have invented a new and useful Improved Spirit or Liquid Level and Instrument for Ascertaining Angles of Inclination or Altitudes, of which the following is a full, clear, and exact description.

My invention relates to an instrument fulfilling the purposes of a level, clinometer, or other instrument used for measuring vertical angles or ascertaining the departure of a surface from the horizontal or vertical; and it has for its object, first, to enable the exact angle of inclination to the horizon (if any) to be at once ascertained and read off at a glance without previous adjustment of the instrument to a level, and, secondly, to render the indexes of liquid-levels generally and similar instruments more steady and definite.

According to the first part of my invention I construct the tube or vessel of the level in the form of a semicircle or other arc of small radius, or in the form of a segment of a sphere, and provide it with a correspondingly-curved scale graduated according to requirements, with reference to which the air-bubble will indicate by its position the angular measurement to be ascertained.

For ascertaining angles of inclination to the horizon or altitudes the instrument may be provided with the necessary sights and adjuncts to enable the object whose altitude is to be ascertained to be sighted and the position of the index to be read off at the same time, or the instrument may be provided with a hinged limb to carry the sights and a graduated arc about the hinge, or the sights may be attached to a limb tangential to the graduated arc and carrying a vernier, so that the sum or the difference (as the case may be) of the angle indicated by the level and the angle indicated on the graduated arc would give the angular height or altitude of the object.

In order to render the index of this instrument and of other instruments (in which an air-bubble is used as the index) more steady and accurate, the liquid is subjected to pressure to compress the air of the bubble and cause the latter to become smaller and more spherical, and consequently more definite in its indication and less liable to error by friction and capillary attraction.

In the accompanying drawings I have represented a few examples of the many various forms which my improved instrument may assume, according to the purpose for which it is intended to be used.

Figure 1 is a face view, Fig. 2 an edge view, and Fig. 3 an edge view, partly in section, of one form of instrument. Fig. 3ª is a longitudinal section of one end of the level-tube, showing a plug or cork fitted to the tube and inclosed in and carried by a screw-cap fitting over the level-tube. Figs. 4 and 5 are face views of other forms adapted to different purposes. Fig. 6 shows the device for introducing the air-bubble into the tube. Fig. 7 is a detailed sectional view of a modification of the pressure-securing appliance or plug.

The same letters of reference indicate the same parts in all the figures.

*a* is the curved glass tube or vessel, and *b* the scale, of corresponding curvature, graduated according to any required system, according to the purpose for which the instrument is to be used.

In Fig. 1 the tube *a* is curved to a radius of about two feet and is in the form of an arc of about thirty degrees. It is recessed into the face of a semicircular plate, *c*, having the scale *b* along the upper side of the tube and having a scale, *d*, along its curved edge, the scales *d* and *b* being divided into degrees of the circles of which they form arcs. The lower edge, *c'*, of plate *c* is a plane surface, and a line drawn through the centers of curvature of the plate *c* and tube *a* would be perpendicular thereto.

*e* is a limb carrying hinged sights *f* and *g*— such as are usually employed in similar instruments—said limb being tangential to the semicircular edge of the plate *c* and capable of being brought to any point therein, either by being mounted on the end of a radial arm pivoted at the center of curvature of plate *c* or by being attached to a carrier, *h*, dovetailed and curved to fit and slide in a dovetailed groove, *i*, in the semicircular edge of the plate *c*. This carrier is provided with an index or vernier for use in reference to the scale *d*.

The bubble in the tube *a* indicates the angle at which the base *c'* may be placed, and the vernier or index on the carrier indicates the angle to which the sight-limb *e* may be adjusted in sighting the object whose altitude is to be ascertained, and the sum or difference (as the case may be) of these two indications is the angular measurement required. The tube *a* is sealed at one end and closed at the other by a plug or cork inclosed by a screw-cap, as shown in Fig. 3ª, or by any other means whereby pressure may be applied to the liquid in order to compress the air-bubble.

In the instrument shown in Fig. 4 the tube *a* is in the form of an arc of rather more than ninety degrees whose center is at *l*, the tube being recessed into the face of a plate, *c*, carrying a scale, *b*, of corresponding curvature to the tube. The sides *c' c²* of the plate *c* are respectively parallel to the sides of a quadrant described from center *l*, and therefore at right angles to one another. The instrument in this form is eminently adapted for use in lieu of a plumb-line and for cognate purposes.

Fig. 5 shows the instrument adapted for laying drains and other purposes. It is similar to that last described, except that it is in the form of a complete semicircle. When the instrument is level, the bubble is at the zero-point. When it is vertical, the bubble marks ninety degrees.

The vessel containing the liquid need not be permanently sealed. I prefer to make it with an opening or neck, in which is inserted a piston or plunger made of cork or other elastic material, or it may be of inelastic material acted on by a spring, the pressure of which on the fluid is regulated by a cap with an internal screw which works on a male screw outside the neck. The small quantity of air in the vessel assumes in compression a globular form and retains sufficient buoyancy to float like a bead of air partly immersed at the surface of the liquid. It thus forms an efficient index and is kept perfectly steady by the pressure. I do not restrict myself to the direct action of a piston on the fluid as the only means to compress the air. In one adaptation of the instrument this object is attained by the pressure of an adjusting-screw on a diaphragm of corrugated metal like that used to form the vacuum-chamber of an aneroid. This diaphragm forms the base of a hemispherical vessel containing the liquid. The circular edge of the glass is cemented to a metal cylinder, and the piston or spring is in the space between the diaphragm and the base of the cylinder. The vessel is filled through an aperture in the wall of the cylinder, which is afterward stopped by a cork or plug. The corrugations allow for the expansion of the liquid by increase of temperature.

The liquid may be water or diluted spirits.

In preparing the instrument for use I usually entirely fill it with liquid and obtain the air required by means of a cup-shaped cavity at the end of a conical cork or plunger. The plunger, being introduced vertically into the vessel, displaces a proportionate bulk of the liquid, which escapes by the neck. The air imprisoned in the cavity emerges and floats as a bubble in the liquid on the instrument being turned up. The size of the bubble is regulated by the pressure applied.

The invention provides a very perfect ship-clinometer. It shows the exact extent of angular movements—such as the pitching or rolling of a ship—as the bubble has no tendency to oscillate in the tube or vessel. By means of the hemispherical instrument not only the inclination of a surface but the direction of its dip is at once shown; and the combined result of any number of vertical angular movements—such as the simultaneous pitching, rolling, or lurching of a ship in a seaway—is at once ascertained by means of parallel circles or other graduations on or adjacent to the spherical surface. It may be applied to under surfaces—for instance, to test the level of a ceiling or the pitch of a rafter—and may be used in elevating and depressing guns and howitzers, making stairs, laying pipes and drains, pitching roofs, adjusting instruments, and for other purposes.

Having now particularly described and ascertained the nature of the said invention and in what manner the same is to be carried into practice, I declare that what I claim is—

1. An instrument for measuring angles of inclination or altitudes, consisting of a level formed of a curved tube or vessel, an air-bubble index, and corresponding scale, as herein described, in combination with a movable limb carrying sights and working tangentially to a graduated arc, substantially as described and shown, for the purpose specified.

2. In a liquid-level in which the floating index consists of an air-bubble, the combination, with an unsealed tube or bulb, of means, substantially as described, for closing the end of the said tube or bulb and compressing the air-bubble.

3. In a level or instrument for ascertaining inclinations or altitudes, the combination of an unsealed tube whose upper surface is curved to an arc of a circle and which is wholly filled with fluid and closed by a removable plug, a floating index therein formed by an air-bubble which has been compressed and caused to assume a spherical form, a scale curved to correspond to the circular surface of the tube or vessel, and a base or support bearing a permanent relation to the position of the tube and scale, substantially as and for the purpose set forth.

4. The combination, with the vessel or tube, of the spring-pressed follower, the plug or stopper, and the cap confining the spring-pressed follower upon said plug or stopper, substantially as and for the purpose set forth.

The foregoing specification of my improved spirit or liquid level and instrument for ascertaining angles of inclination or altitudes signed by me this 5th day of February, 1886.

GEORGE PALMER EVELYN.

Witnesses:
 WM. CLARK,
 53 *Chancery Lane, London, Patent Agent.*
 W. JAMES SKERTEN,
 28 *Southampton Bldgs., London.*